United States Patent
Matsuo

(10) Patent No.: US 12,549,271 B2
(45) Date of Patent: Feb. 10, 2026

(54) TRANSMISSION DEVICE, OPTICAL TRANSMISSION SYSTEM, AND OPTICAL TRANSMISSION METHOD

(71) Applicant: NEC Corporation, Tokyo (JP)

(72) Inventor: Yuushi Matsuo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 247 days.

(21) Appl. No.: 18/279,176

(22) PCT Filed: Mar. 4, 2021

(86) PCT No.: PCT/JP2021/008392
§ 371 (c)(1),
(2) Date: Aug. 28, 2023

(87) PCT Pub. No.: WO2022/185475
PCT Pub. Date: Sep. 9, 2022

(65) Prior Publication Data
US 2025/0080230 A1 Mar. 6, 2025

(51) Int. Cl.
*H04J 14/02* (2006.01)
*H04B 10/564* (2013.01)
*H04B 10/572* (2013.01)

(52) U.S. Cl.
CPC ........... *H04J 14/02* (2013.01); *H04B 10/564* (2013.01); *H04B 10/572* (2013.01)

(58) Field of Classification Search
CPC .... H04B 10/564; H04B 10/572; H04B 10/58; H04B 10/50; H04B 10/40; H04J 14/02;
(Continued)

(56) References Cited

U.S. PATENT DOCUMENTS 9,577,781 B2   2/2017 Nakajima et al.
10,461,852 B1 * 10/2019 Grubb ............... H04B 10/07955
(Continued)

FOREIGN PATENT DOCUMENTS

CN      112217596 A    1/2021
EP      3678304 A1     7/2020
(Continued)

OTHER PUBLICATIONS

Extended European Search Report for EP Application No. 21929049.1, dated on Mar. 26, 2024.
(Continued)

*Primary Examiner* — Hibret A Woldekidan
(74) *Attorney, Agent, or Firm* — Sughrue Mion, PLLC

(57) ABSTRACT

To provide an optical transport device that enable the strengths of optical signals to be recovered when the strengths of the optical signals vary, an optical transmission device comprises: a wavelength selection switch that attenuates, in accordance with an attenuation amount, each of a plurality of optical signals outputted from a plurality of optical transmitter, multiplexes and outputs the attenuated optical signals; and an optical detector that detects and compares the strength of at least one of the plurality of optical signals with a first threshold value and a second threshold value higher than the first threshold value. On the basis of the result of said comparison, the wavelength selection switch controls the attenuation amount such that the optical signal the strength of which has been detected has a strength value between the first threshold value and the second threshold value.

13 Claims, 8 Drawing Sheets

(58) Field of Classification Search
CPC ............... H04J 14/0287; H04J 14/0293; H04J 14/0221; H04J 14/02216; H04Q 2011/0081; H04Q 2011/0084
See application file for complete search history.

(56) References Cited

U.S. PATENT DOCUMENTS

| | | |
|---|---|---|
| 2016/0094305 A1* | 3/2016 | Yamashita ............ H04B 10/564 398/79 |
| 2017/0047990 A1 | 2/2017 | Kawaguchi et al. |
| 2018/0076919 A1 | 3/2018 | Yilmaz et al. |
| 2019/0215089 A1* | 7/2019 | Huang ................. H04J 14/0283 |
| 2019/0253139 A1 | 8/2019 | Satou |

FOREIGN PATENT DOCUMENTS

| | | |
|---|---|---|
| JP | 2013-255195 A | 12/2013 |
| JP | 2016-072834 A | 5/2016 |
| JP | 2016-158125 A | 9/2016 |
| JP | 2017-038328 A | 2/2017 |
| WO | 2018/051935 A1 | 3/2018 |

OTHER PUBLICATIONS

International Search Report for PCT Application No. PCT/JP2021/008392, mailed on Jun. 1, 2021.
English translation of Written opinion for PCT Application No. PCT/JP2021/008392, mailed on Jun. 1, 2021.

* cited by examiner

TRANSMISSION DEVICE, OPTICAL TRANSMISSION SYSTEM, AND OPTICAL TRANSMISSION METHOD

This application is a National Stage Entry of PCT/JP2021/008392 filed on Mar. 4, 2021, the contents of all of which are incorporated herein by reference, in their entirety.

TECHNICAL FIELD

The present disclosure relates to an optical transmission device, an optical transmission system, and an optical transmission method that are capable of controlling intensity of an optical signal suitably.

BACKGROUND ART

In an optical communication system such as a submarine cable system, communication is performed by transmitting and receiving, between land terminal stations, a wavelength division multiplex optical signal acquired by multiplexing a plurality of optical signals having different wavelengths. In this case, intensity of the plurality of optical signals included in the wavelength division multiplex optical signal is adjusted to signal intensity suitable for a system design, and then the optical signal is output from a terminal station to a submarine transmission path.

Further, in recent years, there has been utilized spectrum sharing in which a band of a wavelength division multiplex optical signal is allocated to a different user. In the spectrum sharing, each user controls an optical transmitter in such a way that an optical signal is output at signal intensity suitable for a system design.

In this case, the intensity of the optical signal may fluctuate due to aging deterioration, a failure, or the like of the optical transmitter for outputting the optical signal, a land transmission path for connecting the optical transmitter to a land terminal station, or the like. Thus, techniques for adjusting intensity of an optic signal have been used.

For example, PTL 1 discloses that intensity of optical signals included in a wavelength division multiplex optical signal is adjusted in such a way as to be uniform. Further, PTL 2 also describes a related technique.

CITATION LIST

Patent Literature

PTL 1: Japanese Unexamined Patent Application Publication No. 2017-038328
PTL 2: Japanese Unexamined Patent Application Publication No. 2013-255195

SUMMARY OF INVENTION

Technical Problem

However, there has been no means for restoring intensity of an optical signal to signal intensity suitable for a system design at a time of fluctuation of the intensity of the optical signal. When intensity of an optical signal transmitted from a terminal station fluctuates from the suitable signal intensity, intensity of an optical signal other than the optical signal having fluctuating intensity among optical signals included in the wavelength division multiplex optical signal is also affected due to a gain characteristic of an amplifier provided to a submarine transmission path.

Particularly in spectrum sharing, fluctuation of intensity of an optical signal in a band being allocated to a specific user as described above affects an optical signal in a band being allocated to another user, and thus a problem is caused.

The present disclosure has been made in view of the above-mentioned problem and an object of the present disclosure is to provide an optical transmission device, an optical transmission system, and an optical transmission method that are capable of restoring intensity of an optical signal when the intensity of the optical signal fluctuates due to aging deterioration, a failure, or the like of a transmitter, a land transmission path, or the like.

Solution to Problem

An optical transmission device according to the present disclosure includes:
a wavelength selection switch means for attenuating each of a plurality of optical signals being output from a plurality of optical transmitting means according to an attenuation amount, and multiplexing and outputting the optical signals being attenuated;
an optical detection means for detecting intensity of at least one of the plurality of optical signals and performs comparison between the intensity, and a first threshold value and a second threshold value greater than the first threshold value, wherein
the wavelength selection switch means controls the attenuation amount in such a way that the intensity of the optical signal subjected to intensity detection is a value between the first threshold value and the second threshold value, by reducing the attenuation amount with respect to the optical signal when the intensity of the optical signal subjected to intensity detection is less than the first threshold value, and increasing the attenuation amount with respect to the optical signal when the intensity of the optical signal subjected to intensity detection is greater than the second threshold value, based on a result of the comparison.

Further, an optical transmission system according to the present disclosure includes:
the optical transmission device described above; and
a plurality of the optical transmitting means.

Further, an optical transmission method according to the present disclosure includes:
attenuating each of a plurality of optical signals being output from a plurality of optical transmitting means according to an attenuation amount;
multiplexing and outputting the optical signals being attenuated;
detecting intensity of at least one of the plurality of optical signals and performing comparison between the intensity, and a first threshold value and a second threshold value greater than the first threshold value; and
controlling the attenuation amount in such a way that the intensity of the optical signal subjected to intensity detection is a value between the first threshold value and the second threshold value, by reducing the attenuation amount with respect to the optical signal when the intensity of the optical signal subjected to intensity detection is less than the first threshold value, and increasing the attenuation amount with respect to the optical signal when the intensity of the optical signal subjected to intensity detection is greater than the second threshold value, based on a result of the comparison.

Advantageous Effects of Invention

According to the present disclosure, it is possible to provide an optical transmission device, an optical transmission system, and an optical transmission method that are capable of restoring intensity of an optical signal when the intensity of the optical signal fluctuates due to aging deterioration, a failure, or the like of a transmitter, a land transmission path, or the like.

EXAMPLE EMBODIMENT

First Example Embodiment

Figure 1:
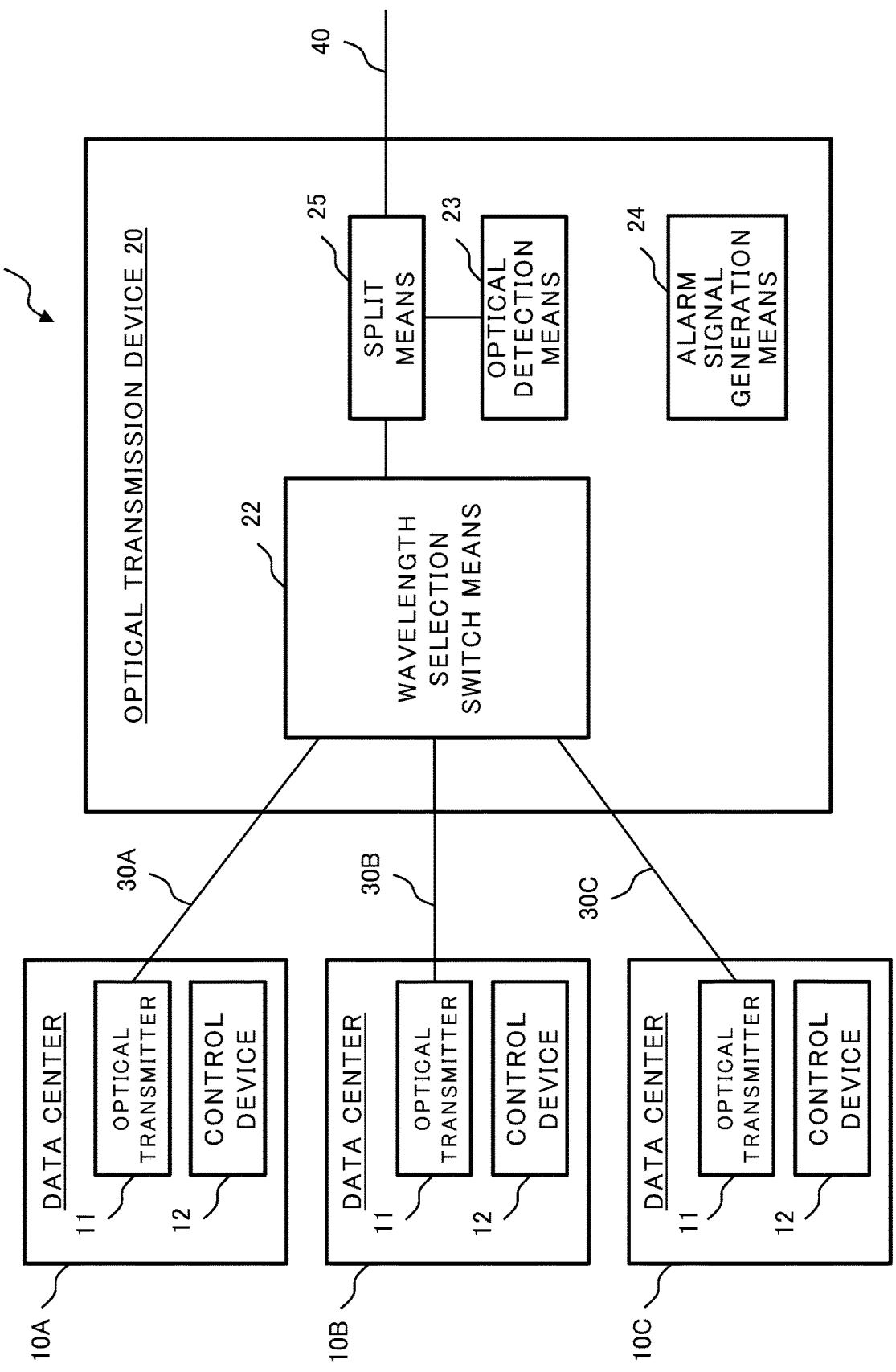
FIG. 1 is a block diagram illustrating a configuration example of an optical transmission system according to a first example embodiment of the present disclosure.
Figure 2:
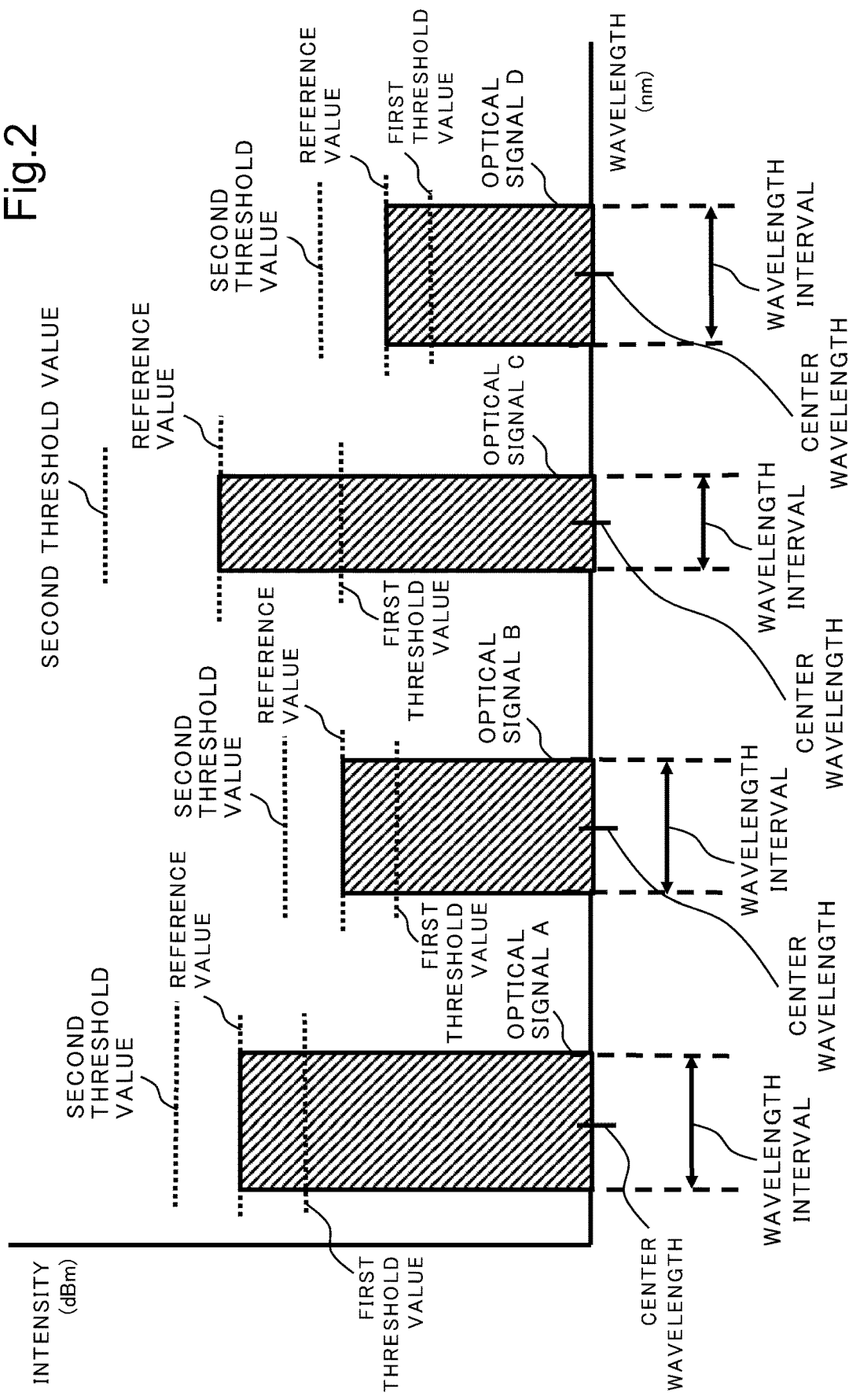
FIG. 2 is a diagram for describing the optical transmission system according to the first example embodiment of the present disclosure.
Figure 3:
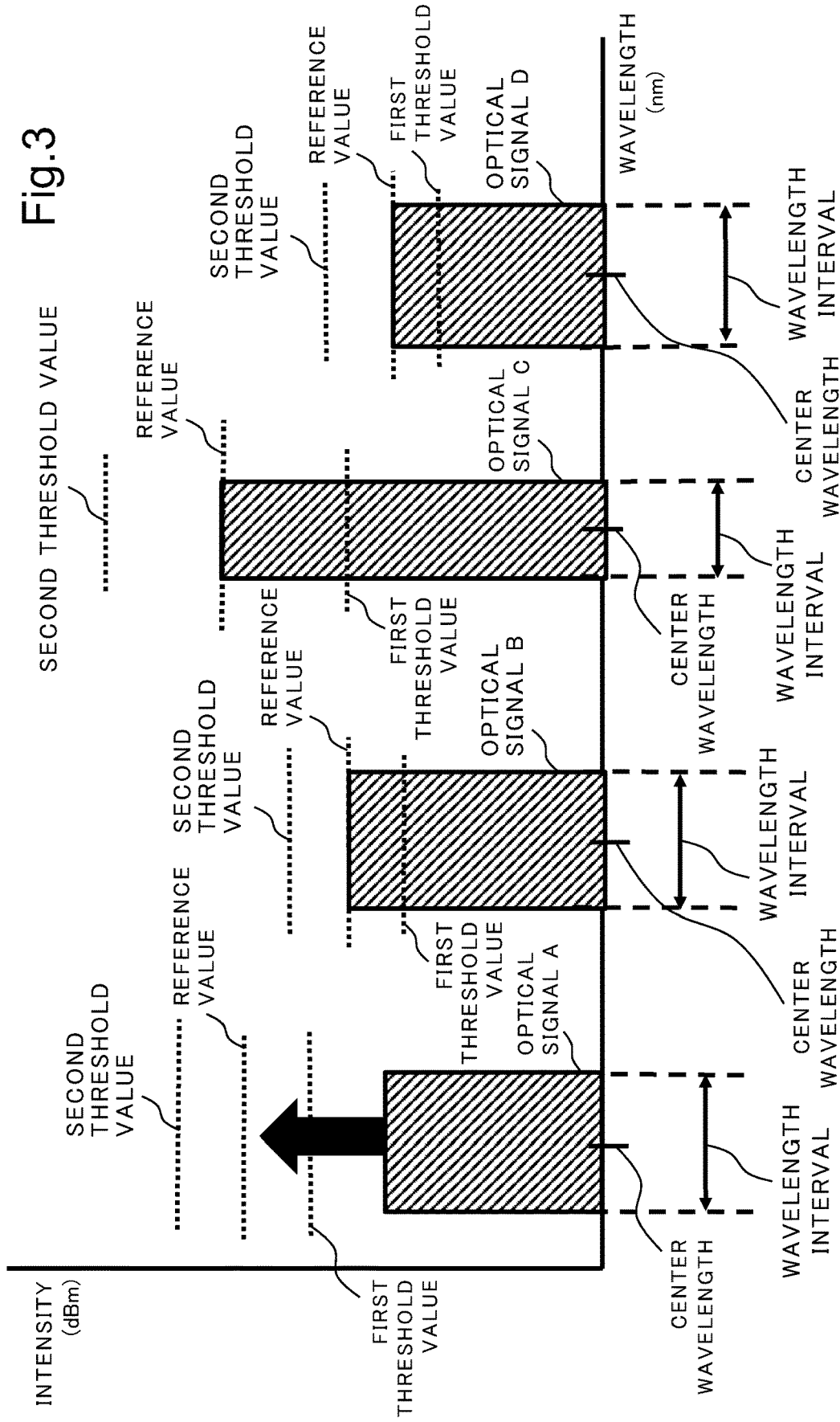
FIG. 3 is a diagram for describing the optical transmission system according to the first example embodiment of the present disclosure.
Figure 4:
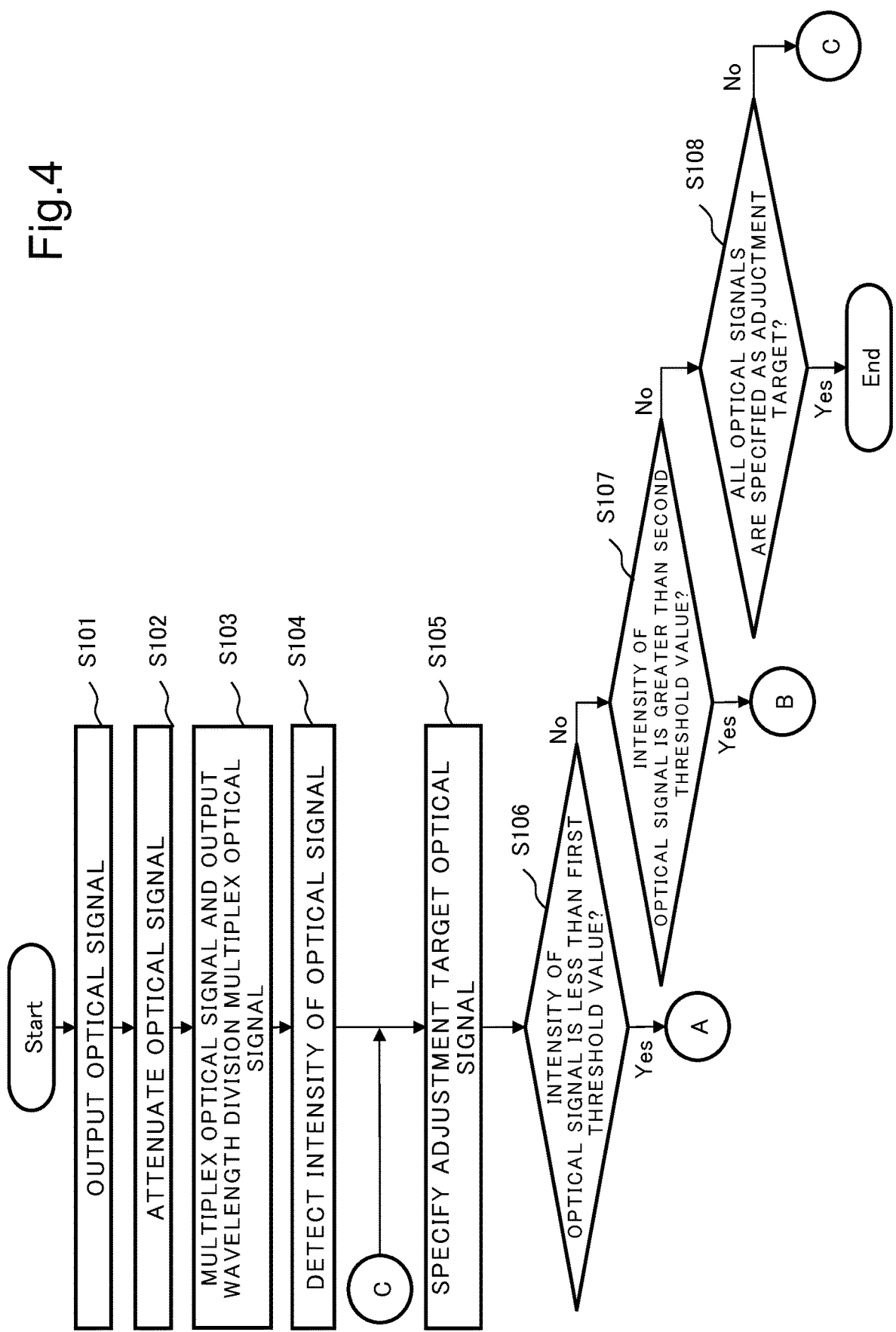
FIG. 4 is a flowchart illustrating an operation of the optical transmission system according to the first example embodiment of the present disclosure.

With reference to FIG. 1, FIG. 2, FIG. 3, and FIG. 4, an optical transmission system 1 according to a first example embodiment is described. FIG. 1 is a block diagram illustrating a configuration example of the optical transmission system 1. Further, FIG. 2 and FIG. 3 are diagrams for describing details of the optical transmission system. FIG. 4 is a flowchart illustrating an operation example of the optical transmission system 1.

As illustrated in FIG. 1, the optical transmission system 1 includes data centers 10A, 10B, and 10C, an optical transmission device 20, land transmission paths 30A, 30B, and 30C, and a submarine transmission path 40. When there is no need to distinguish the data centers 10A, 10B, and 10C from one another, each of the data centers 10A, 10B, and 10C is referred to as a data center 10. Further, when there is no need to distinguish the land transmission paths 30A, 30B, and 30C from one another, each of the land transmission paths 30A, 30B, and 30C is referred to as a land transmission path 30.

The data center 10 includes an optical transmitter 11 and a control device 12. The optical transmitter 11 is associated with an optical transmitting means. The optical transmitter 11 outputs an optical signal to the optical transmission device 20 via the land transmission path 30. The optical transmitter 11 outputs the optical signal at predetermined intensity. Further, the optical transmitter 11 is capable of adjusting the intensity of the optical signal according to an instruction from the control device 12. For example, the optical transmitter 11 is an optical transponder. The data center 10 may include a plurality of optical transmitters 11. In this case, the data center 10 outputs, to the optical transmission device 20, a wavelength division multiplex optical signal acquired by multiplexing optical signals output from the plurality of optical transmitters 11.

The control device 12 controls the optical transmitter 11. For example, the control device 12 transmits an instruction relating to intensity received from a user to the optical transmitter 11, and thus causes the optical transmitter 11 to output the optical signal at the intensity. Further, the control device 12 is capable of communicating with the optical transmission device 20, and notifies a user of the optical transmitter 11 of information received from the optical transmission device 20. For example, when information indicating an abnormality of the optical signal is received from an alarm signal generation means 24, which is described later, the control device 12 notifies a user of the optical transmitter 11 of occurrence of the abnormality.

The optical transmission device 20 includes a wavelength selection switch means 22, an optical detection means 23, the alarm signal generation means 24, and a split means 25. The optical transmission device 20 is connected to the plurality of data centers 10 via the land transmission paths 30.

The wavelength selection switch means 22 attenuates each of a plurality of optical signals output from the plurality of optical transmitters 11 according to an attenuation amount, multiplexes the attenuated optical signals, and outputs the wavelength division multiplex optical signal. In the optical transmission system 1, the wavelength selection switch means 22 attenuates each of the plurality of optical signals that are output from the optical transmitters 11 in the data centers 10A, 10B, and 10C, according to a predetermined attenuation amount.

The wavelength selection switch means 22 is a wavelength selective switch (WSS), for example. The WSS demultiplexes the input optical signal for each wavelength, reflects each of the demultiplexed optical signals at a mirror, multiplexes the reflected optical signals, and outputs the wavelength division multiplex optical signal. The WSS is capable of adjusting the attenuation amount with respect to each of the optical signals by adjusting an angle of the mirror at which each of the demultiplexed optical signals is reflected. The wavelength division multiplex optical signal that is output from the wavelength selection switch means 22 is split by the split means 25, and is output to the submarine transmission path 40 and the optical detection means 23. The split means 25 is an optical coupler, for example.

With reference to FIG. 2, details of the wavelength selection switch means 22 are described. In the description, the data center 10A outputs, to the optical transmission device 20, a wavelength division multiplex optical signal acquired by multiplexing an optical signal A and an optical signal B that are illustrated in FIG. 2. Further, the data center 10B outputs an optical signal C to the optical transmission device 20, and the data center 10C outputs an optical signal D to the optical transmission device 20.

For example, the optical signals A, B, C, and D that are illustrated in FIG. 2 are input to the wavelength selection switch means 22. In the wavelength selection switch means 22, a plurality of center wavelengths and wavelength intervals having the plurality of center wavelengths as centers thereof, which are illustrated in FIG. 2, are set as a plurality of transmission bands. The wavelength selection switch means 22 blocks light lying outside the transmission band by maximizing the attenuation amount in a band outside the transmission band. Further, the wavelength selection switch means 22 attenuates intensity of a light signal in the transmission band to a reference value that is set for each transmission band. For example, the attenuation amount in the transmission band in the wavelength selection switch means 22 is a difference between the predetermined intensity of the optical signal and the reference value. Further, in the transmission band, a first threshold value and a second threshold value greater than the first threshold value are set.

The optical detection means 23 detects intensity of each of the plurality of optical signals, based on the wavelength division multiplex optical signal that is output from the wavelength selection switch means 22. Specifically, the optical detection means 23 receives the wavelength division multiplex optical signal split by the split means 25. The optical detection means 23 detects intensity of the optical signals in the plurality of transmission bands by calculating intensity per unit wavelength. The optical detection means 23 includes an optical spectrum analyzer, for example.

Further, the optical detection means 23 stores the first threshold value and the second threshold value that are set for each of the transmission bands. For example, as illustrated in FIG. 3, when it is detected that the intensity of the optical signal A in the transmission band is below the first threshold value, the optical detection means 23 reduces the attenuation amount with respect to the transmission band in the wavelength selection switch means 22. With this, the wavelength selection switch means 22 increases the intensity of the optical signal A in the wavelength division multiplex optical signal. Meanwhile, when it is detected that the intensity of the optical signal A in the transmission band exceeds the second threshold value, the optical detection means 23 increases the attenuation amount with respect to the transmission band in the wavelength selection switch means 22. With this, the wavelength selection switch means 22 reduces the intensity of the optical signal. As described above, the intensity of the optical signal in the transmission band is maintained between the first threshold value and the second threshold value by the optical detection means 23 and the wavelength selection switch means 22.

Further, the alarm signal generation means 24 generates an alarm signal in at least one of a case in which the intensity of the optical signal is below the first threshold value and a case in which the intensity of the optical signal exceeds the second threshold value. For example, when at least one of the optical signals A, B, C, and D, which are illustrated in FIG. 2, is below the first threshold value, the alarm signal generation means 24 generates the alarm signal. Further, when at least one of the optical signals A, B, C, and D, which are illustrated in FIG. 2, exceeds the second threshold value, the alarm signal generation means 24 generates the alarm signal. When the alarm signal is generated, the alarm signal generation means 24 notifies a terminal station in which the optical transmission device 20 is installed that the optical signal has an abnormality.

Further, it is assumed that the alarm signal generation means 24 stores an address (for example, a media access control (MAC) address or an Internet Protocol (IP) address) of the control device 12 controlling the optical transmitter 11 that outputs the optical signal. For example, the alarm signal generation means 24 stores an address of the control device 12 in the data center 10A in association with the optical signal A and the optical signal B. Further, the alarm signal generation means 24 stores an address of the control device 12 in the data center 10B in association with the optical signal C, and stores an address of the control device 12 in the data center 10C in association with the optical signal D.

When the intensity of the optical signal is below the first threshold value, or the intensity of the optical signal exceeds the second threshold value, the alarm signal generation means 24 notifies the address associated with the optical signal that the optical signal has an abnormality. With this, a user of the optical transmitter 11 in the data center 10 can grasp that the optical signal has an abnormality.

Figure 5:
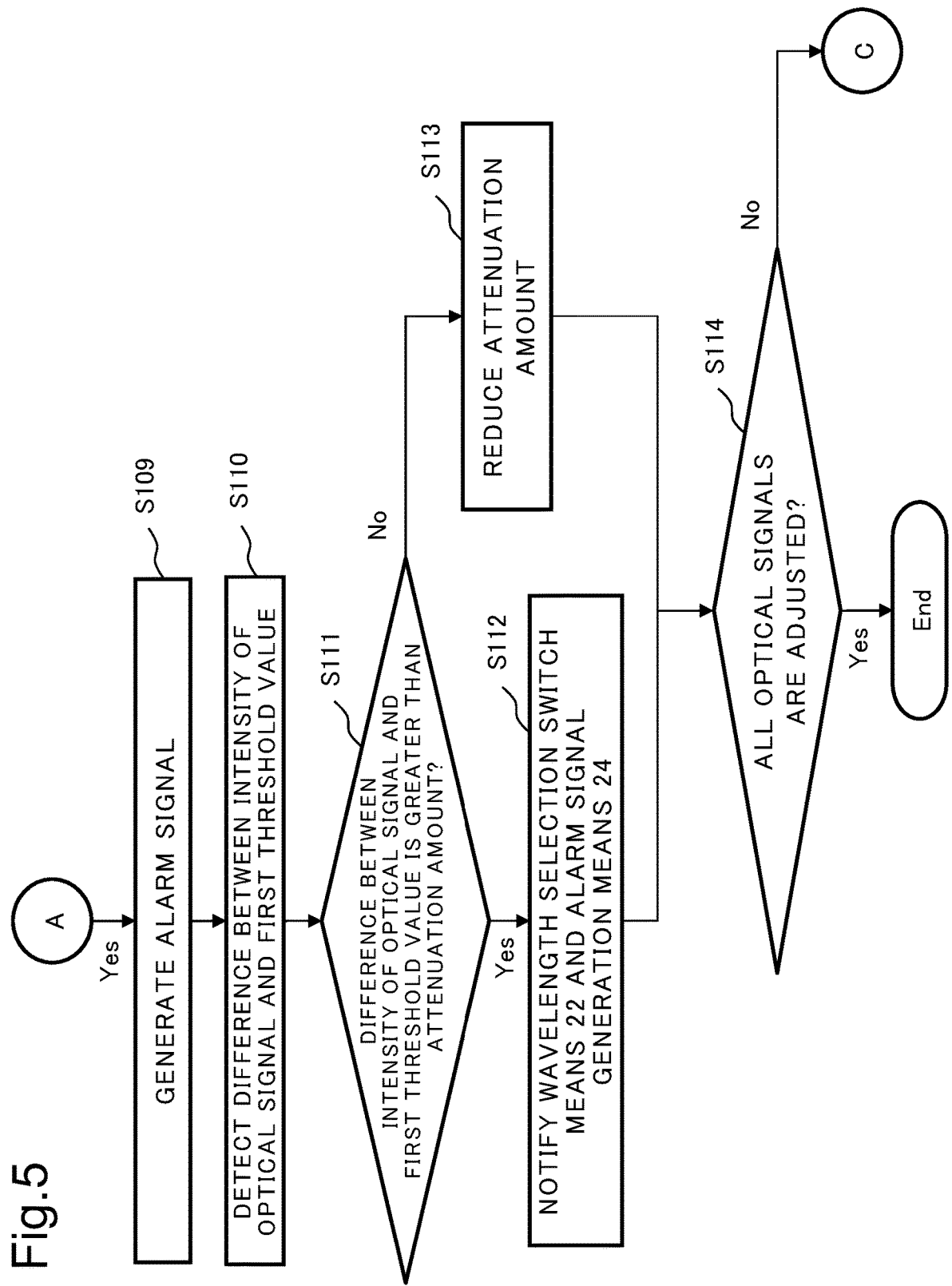
FIG. 5 is a flowchart illustrating the operation of the optical transmission system according to the first example embodiment of the present disclosure.
Figure 6:
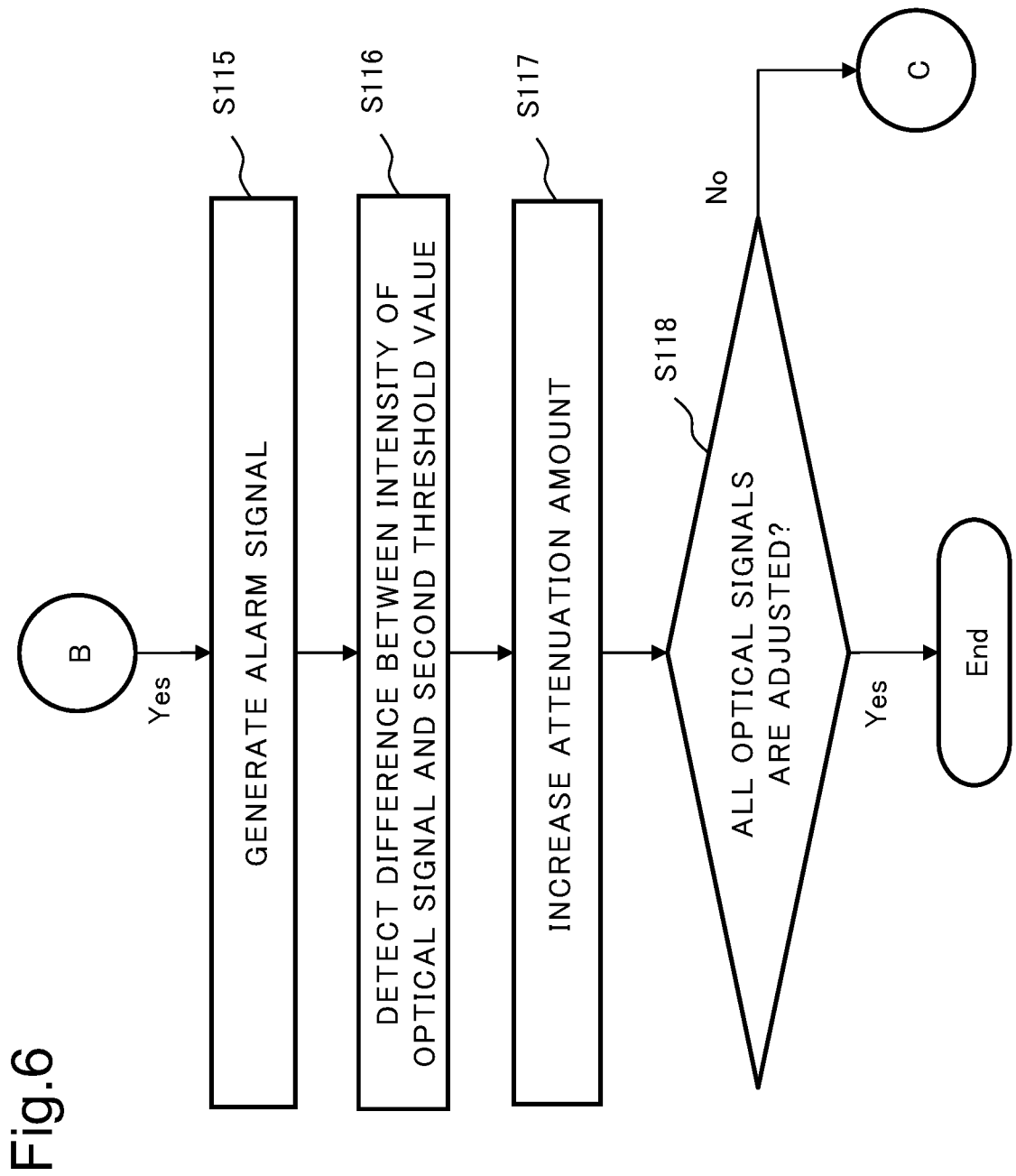
FIG. 6 is a flowchart illustrating the operation of the optical transmission system according to the first example embodiment of the present disclosure.

Next, with reference to FIG. 4, FIG. 5, and FIG. 6, the operation of the optical transmission system 1 is described. FIG. 4, FIG. 5, and FIG. 6 are flowcharts illustrating an operation example of the optical transmission system 1.

The optical transmitter 11 outputs the optical signal to the optical transmission device 20 (S101). In the present operation example, the two optical transmitters 11 in the data center 10A output the optical signal A and the optical signal B. Further, the optical transmitter 11 in the data center 10B outputs the optical signal C, and the optical transmitter 11 in the data center 10C outputs the optical signal D.

The wavelength selection switch means 22 attenuates the optical signals (S102). In the present operation example, the optical signals A, B, C, and D are input to the wavelength selection switch means 22. The wavelength selection switch means 22 demultiplexes each of the optical signals A to D for each wavelength, and applies the predetermined attenuation amount to each of the optical signals A to D. For example, the wavelength selection switch means 22 attenuates the optical signal by the difference between the predetermined intensity of the optical signal and the reference value set to the optical signal. With this, as illustrated in FIG. 2, each of the optical signals attenuated by the wavelength selection switch means 22 has the intensity being the reference value.

The wavelength selection switch means 22 multiplexes the attenuated optical signals, and outputs the wavelength division multiplex optical signal (S103). The optical detection means 23 detects the intensity of the optical signal (S104). Specifically, the optical detection means 23 receives the wavelength division multiplex optical signal split by the split means 25, and detects the intensity of the optical signal included in the wavelength division multiplex optical signal.

The optical detection means 23 selects one of the plurality of transmission bands, and thus specifies the optical signal in the transmission band as an adjustment target optical signal (S105). In the present operation example, the optical detection means 23 selects at least one of the transmission bands in which the optical signals A to D lie, and specifies one of the optical signals A to D as the adjustment target optical signal. For example, the optical detection means 23 specifies, as the adjustment target, the optical signal A having the shortest center wavelength among the optical signals A to D.

The optical detection means 23 determines whether the intensity of the optical signal is less than the first threshold value (S106). Specifically, when the optical signal A is specifies as the adjustment target in S105 described above, the optical detection means 23 determines whether the intensity of the optical signal A is less than the first threshold value that is set for the transmission band associated with the optical signal A.

When it is not determined that the intensity of the optical signal is less than the first threshold value (No in S106), the optical detection means 23 determines whether the intensity of the optical signal is greater than the second threshold value (S107). For example, the optical detection means 23 determines whether the intensity of the optical signal A is greater than the second threshold value that is set for the transmission band associated with the optical signal A. When it is not determined that the intensity of the optical signal is greater than the second threshold value (No in S107), the optical detection means 23 determines whether all the optical signals are specified as the adjustment target (S108). Specifically, the optical detection means 23 determines whether all the optical signals A to D included in the wavelength multiplex optical signal are specified as the adjustment target in S105. For example, the optical detection means 23 stores the transmission band of the optical signal specified in S105, performs comparison with the transmission band set by the wavelength selection switch means 22, and thus determines whether all the optical signals are specified as the adjustment target. Further, when all the optical signals are specified as the adjustment target (Yes in S108), adjustment of the attenuation amount with respect to the wavelength selection switch means 22 ends. Specifically, the operation from S101 to S103 is continuously executed in the optical transmission system 1, but the operation from S104 to S118 is not executed.

Further, when it is determined that at least one of the optical signals included in the wavelength multiplex optical signal is not specified as the adjustment target (No in S108), the optical detection means 23 executes the processing in S105. In the processing in S105, the optical detection means 23 specifies, as a new adjustment target, the optical signal that is not specified as the adjustment target optical signal. For example, when the optical signal A is specified as the adjustment target in S105 that is previously executed, the optical detection means 23 specifies any one of the optical signals B to D as the new adjustment target.

In the processing in S106, when the intensity of the optical signal being the adjustment target is less the first threshold value (Yes in S106), the alarm signal generation means 24 generates the alarm signal as illustrated in FIG. 5 (S109). In this case, the optical detection means 23 notifies the alarm signal generation means 24 of information indicating the adjustment target optical signal. The alarm signal generation means 24 notifies the terminal station in which the optical transmission device 20 is installed that the notified optical signal has an abnormality. Further, the alarm signal generation means 24 generates the alarm signal including the information indicating the notified optical signal, and transmits the alarm signal to the address associated with the optical signal. With this, the control device 12 in the data center 10 is capable of receiving the alarm signal, and thus a user of the optical transmitter 11 in the data center 10 can be notified that the optical signal has an abnormality.

Subsequently, the optical detection means 23 detects the difference between the intensity of the optical signal and the first threshold value, the optical signal being determined to have the intensity below the first threshold value (S110). The optical detection means 23 determines whether the difference between the intensity of the optical signal and the first threshold value is greater than the attenuation amount applied to the optical signal (S111). When it is determined that the difference is greater than the attenuation amount (Yes in S111), the optical detection means 23 issues a notification to the wavelength selection switch means 22 and the alarm signal generation means 24 (S112). For example, the optical detection means 23 issues a notification to the wavelength selection switch means 22 in such a way that the attenuation amount with respect to the transmission band of the optical signal is zero. Further, the optical detection means 23 notifies the alarm signal generation means 24 of a difference between the difference between the intensity of the optical signal and the first threshold value and the attenuation amount before being zero, and the transmission band of the optical signal. The alarm signal generation means 24 notifies the address associated with the transmission band of the optical signal in such a way that an output of the optical transmitter 11 is increased by the difference notified from the optical detection means 23. With this, in a case in which the attenuation amount in the wavelength selection switch means 22 is zero, when the intensity of the optical signal is still below the first threshold value, a notification can be issued in such a way to increase the intensity of the optical signal output from the optical transmitter 11 in the optical transmission system 1. A user of the optical transmitter 11 that receives the notification increases an output of the optical transmitter 11, and thus the intensity of the optical signal is adjusted to exceed the first threshold value.

Further, when it is not determined that the difference is greater than the attenuation amount (No in S111), the optical detection means 23 notifies the wavelength selection switch means 22 of the difference between the intensity of the optical signal and the first threshold value and the transmission band of the optical signal, the optical signal being determined to have the intensity below the first threshold value. With this, the wavelength selection switch means 22 reduces the attenuation amount in the notified transmission band by the notified difference (S113). The wavelength selection switch means 22 may reduce the attenuation amount by an amount required by adding a predetermined certain amount to the notified difference. With this, in the optical transmission system 1, the intensity of the optical signal determined to have the intensity below the first threshold value can be increased.

After S112 and S113, the optical detection means 23 determines whether all the optical signals are specified as the adjustment target (S114). Specifically, the optical detection means 23 executes the processing similar to S108. Further, when it is determined that all the optical signals are specified as the adjustment target (Yes in S114), adjustment of the attenuation amount with respect to the wavelength selection switch means 22 ends. Specifically, the operation from S101 to S103 is continuously executed in the optical transmission system 1, but the operation from S104 to S118 is not executed.

Further, when it is determined that at least one of the optical signals included in the wavelength multiplex optical signal is not specified as the adjustment target (No in S114), the optical detection means 23 executes the processing in S105. Similarly to the processing in S105 after the processing in S108, the optical detection means 23 specifies, as the new adjustment target, the optical signal that is not specified as the adjustment target optical signal in this processing in S105.

Further, when intensity of at least one optical signal included in the wavelength division multiplex signal is greater than the second threshold value (Yes in S107), the alarm signal generation means 24 generates the alarm signal as illustrated in FIG. 6 (S115). In this case, the optical detection means 23 notifies the alarm signal generation means 24 of information indicating the adjustment target optical signal. The alarm signal generation means 24 notifies the terminal station in which the optical transmission device 20 is installed that the notified optical signal has an abnormality. Further, the alarm signal generation means 24 generates the alarm signal including the information indicating the notified optical signal, and transmits the alarm signal to the address associated with the optical signal. With this, the control device 12 in the data center 10 is capable of receiving the alarm signal, and thus a user of the optical transmitter 11 in the data center 10 can be notified that the optical signal has an abnormality.

Subsequently, the optical detection means 23 detects the difference between the intensity of the optical signal and the second threshold value, the optical signal being determined to have the intensity exceeding the second threshold value (S116). In this case, the optical detection means 23 notifies the wavelength selection switch means 22 of the detected difference and the transmission band of the optical signal.

The wavelength selection switch means increases the attenuation amount (S117). Specifically, the attenuation amount for the optical signal in the transmission band notified from the optical detection means 23 is increased by the notified difference. The wavelength selection switch means 22 may increase the attenuation amount by an amount acquired by adding a predetermined certain amount to the notified difference. With this, in the optical transmission system 1, the intensity of the optical signal being determined to have the intensity exceeding the second threshold value can be reduced.

After S117, the optical detection means 23 determines whether all the optical signals are specified as the adjustment target (S118). Specifically, the optical detection means 23 executes the processing similar to S108. Further, when it is determined that all the optical signals are specified as the adjustment target (Yes in S118), adjustment of the attenuation amount with respect to the wavelength selection switch means 22 ends. Specifically, the operation from S101 to S103 is continuously executed in the optical transmission system 1, but the operation from S104 to S118 is not executed.

Further, when it is determined that at least one of the optical signals included in the wavelength multiplex optical signal is not specified as the adjustment target (No in S118), the optical detection means 23 executes the processing in S105. Similarly to the processing in S105 after the processing in S108, the optical detection means 23 specifies, as the new adjustment target, the optical signal that is not specified as the adjustment target optical signal in this processing in S105.

In a case in which, in the processing in S108 illustrated in FIG. 4, the optical detection means 23 determines that all the optical signals are specified as the adjustment target (Yes in S108), a case in which, in the processing in S114 illustrated in FIG. 5, the optical detection means 23 determines that all the optical signals are specified as the adjustment target (Yes in S114), and a case in which, in the processing in S118 illustrated in FIG. 6, the optical detection means 23 determines that all the optical signals are specified as the adjustment target (Yes in S118), adjustment of the attenuation amount with respect to the wavelength selection switch means 22 ends. Meanwhile, after the processing, the processing may be executed again from S104, instead of terminating adjustment of the attenuation amount with respect to the wavelength selection switch means 22. With this, the intensity of the optical signal can be continuously adjusted between the first threshold value and the second threshold value. When the processing is executed again from S104, the optical detection means 23 stores that none of the optical signals is specified yet as the adjustment target.

As described above, the optical transmission system 1 includes the wavelength selection switch means 22 and the optical detection means 23. The wavelength selection switch means 22 attenuates each of the plurality of optical signals output from the plurality of optical transmitting means (optical transmitters 11) according to the attenuation amount, and multiplexes and outputs the attenuated optical signals. Further, the optical detection means 23 detects intensity of each of the plurality of optical signals, and performs comparison between the intensity, and the first threshold value and the second threshold value greater than the first threshold value. Moreover, the wavelength selection switch means 22 reduces the attenuation amount with respect to the optical signal when the intensity of the optical signal is less than the first threshold value, and increases the attenuation amount with respect to the optical signal when the intensity of the optical signal is greater than the second threshold value greater than the first threshold value, based on the result of the comparison. With this, the wavelength selection switch means 22 controls the attenuation amount in such a way that the intensity of the optical signal subjected to intensity detection is a value between the first threshold value and the second threshold value.

The intensity of the optical signal to be input to the optical transmission device 20 may fluctuate due to aging deterioration, a failure, or the like of the optical transmitter for outputting the optical signal, the land transmission path for connecting the optical transmitter to the land terminal station, or the like. In the optical transmission system 1, even when the intensity of the optical signal fluctuates, the intensity of the optical signal can be restored from the first threshold value to the second threshold value.

Second Example Embodiment

Figure 7:
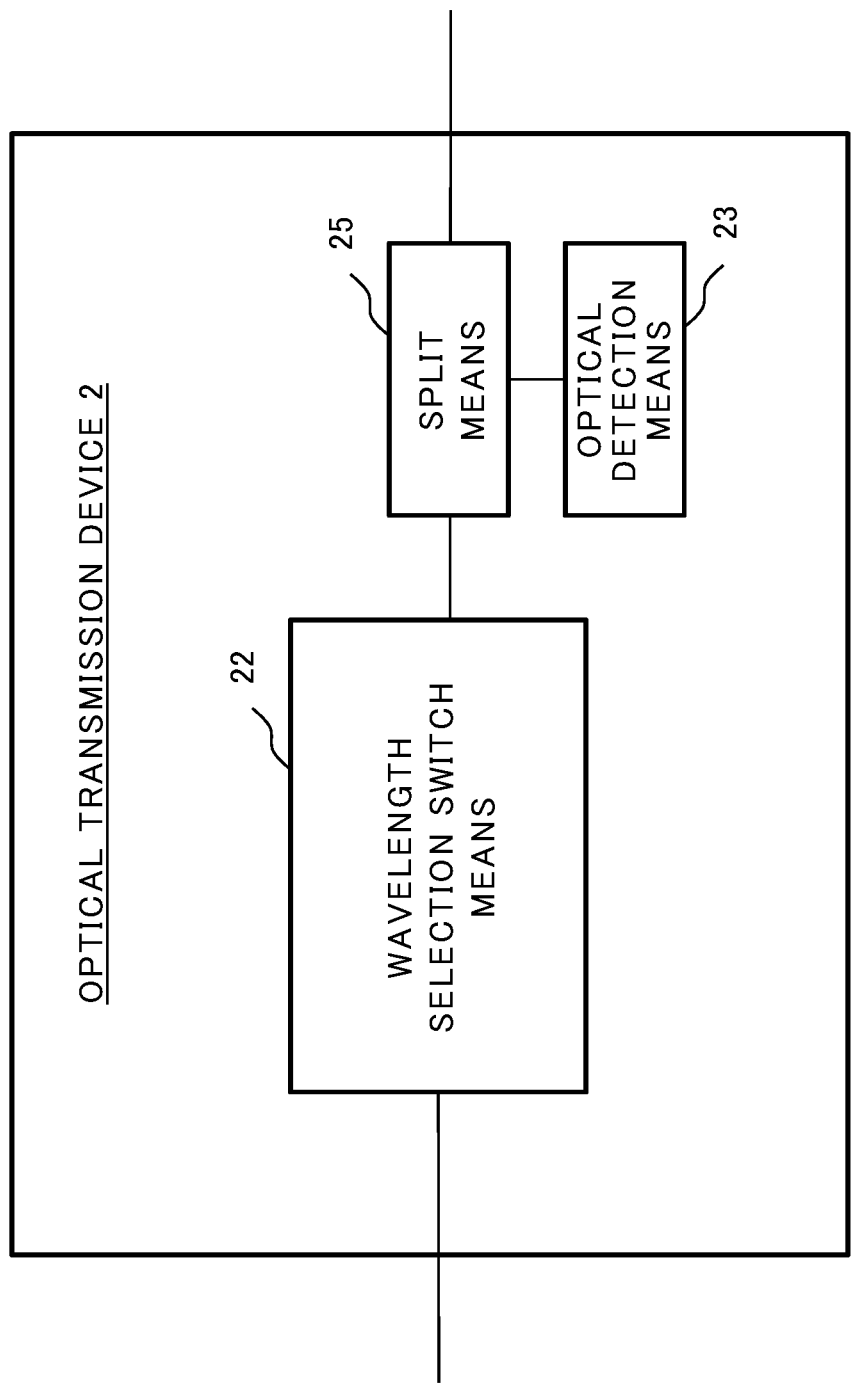
FIG. 7 is a block diagram illustrating a configuration example of an optical transmission device according to a second example embodiment of the present disclosure.
Figure 8:
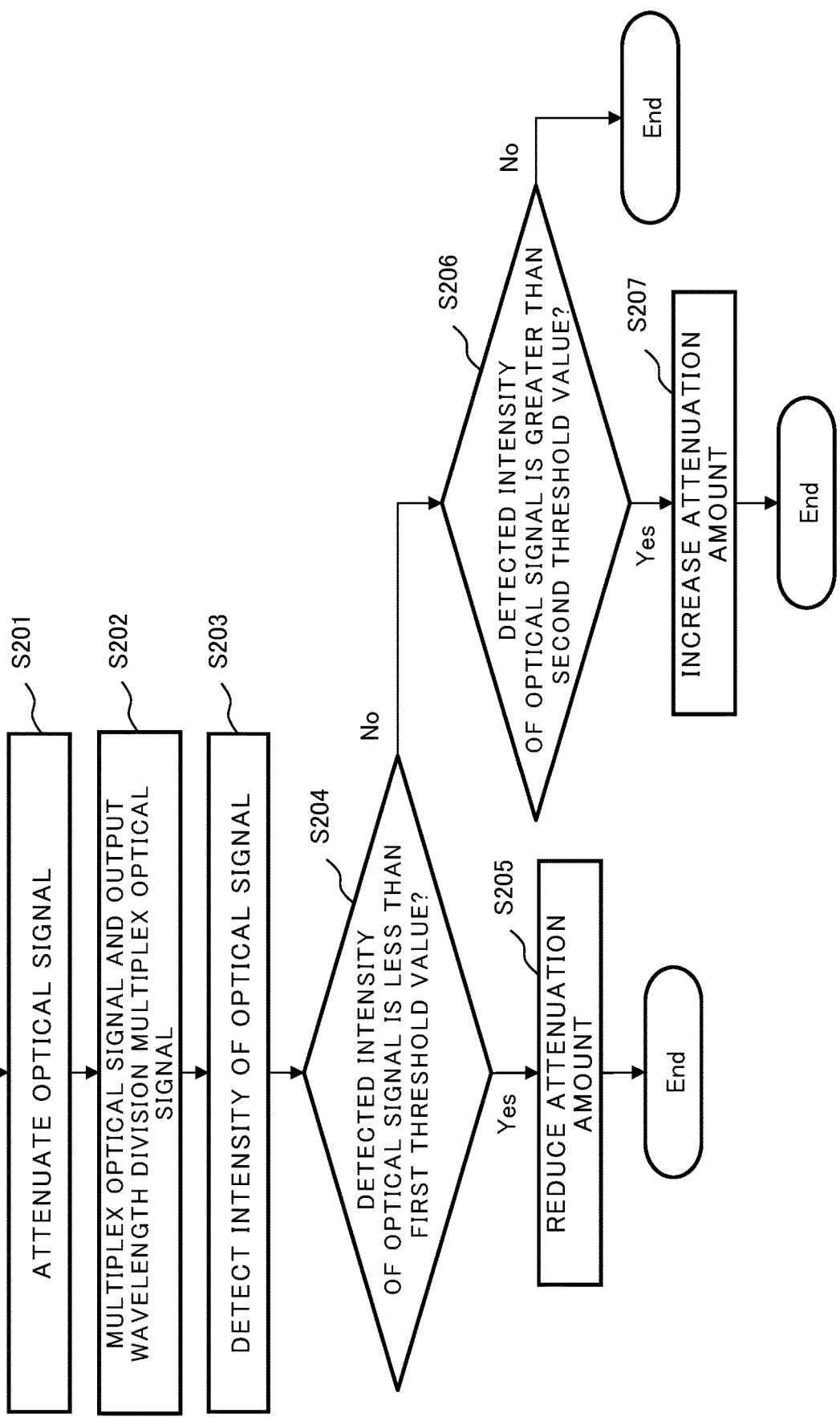
FIG. 8 is a flowchart illustrating an operation of the optical transmission device according to the second example embodiment of the present disclosure.

With reference to FIG. 7 and FIG. 8, an optical transmission device 2 according to a second example embodiment is described. FIG. 7 is a block diagram illustrating a configuration example of the optical transmission device 2. Further, FIG. 8 is a flowchart illustrating an operation example of the optical transmission device 2. As illustrated in FIG. 7, the optical transmission device 2 includes the wavelength selection switch means 22 and the optical detection means 23.

The wavelength selection switch means 22 attenuates each of the plurality of optical signals output from the plurality of optical transmitting means according to the attenuation amount, and multiplexes and outputs the attenuated optical signals. Further, it is assumed that the wavelength division multiplex optical signal is output from a data center, being not illustrated, or the like, to the wavelength selection switch means 22. The wavelength selection switch means 22 of the optical transmission device 2 may include a configuration, a function, and a connection relationship that are similar to those of the wavelength selection switch means 22 in the optical transmission system 1.

The optical detection means 23 detects intensity of at least one optical signal of the plurality of optical signals. Further, the optical detection means 23 performs comparison between the detected intensity, and the first threshold value and the second threshold value greater than the first threshold value. The optical detection means 23 of the optical transmission device 2 may include a configuration, a function, and a connection relationship that are similar to those of the optical detection means 23 in the optical transmission system 1. The optical detection means 23 notifies the wavelength selection switch means 22 of the comparison result between the detected intensity, and the first threshold value and the second threshold value.

Moreover, when the intensity of the optical signal is less than the first threshold value, the wavelength selection switch means 22 reduces the attenuation amount with respect to the optical signal, based on the result of the comparison performed by the optical detection means 23. Further, when the intensity of the optical signal is greater than the second threshold value greater than the first threshold value, the wavelength selection switch means 22 increases the attenuation amount with respect to the optical signal, based on the result of the comparison performed by the optical detection means 23. With this, the wavelength selection switch means 22 controls the attenuation amount with respect to the optical signal in such a way that the intensity of the optical signal subjected to intensity detection is a value between the first threshold value and the second threshold value.

As illustrated in FIG. 7, the optical transmission device 2 may include the split means 25. For example, the split means 25 is not required when there is no need to output the light from the wavelength selection switch means 22 to the outside.

With reference to FIG. 8, the operation of an optical transmission device 2 is described.

the wavelength selection switch means 22 attenuates the optical signals (S201). The wavelength selection switch means 22 multiplexes and outputs the attenuated optical signals (S202). The optical detection means 23 detects intensity of at least one optical signal of the plurality of optical signals (S203). The optical detection means 23 determines whether the detected intensity of the optical signal is less than the first threshold value (S204).

When the optical detection means 23 determines that the intensity of any one optical signal of the optical signals subjected to intensity detection is less than the first threshold value (Yes in S204), the wavelength selection switch means 22 reduces the attenuation amount with respect to the optical signal having the intensity less than the first threshold value.

Further, when the optical detection means 23 does not determined that none of the optical signals subjected to intensity detection has the intensity less than the first threshold value (No in S204), the optical detection means 23 determines whether the intensity of at least one optical signal subjected to intensity detection is greater than the second threshold value (S206).

When the optical detection means 23 determines that the intensity of any one optical signal of the optical signals subjected to intensity detection is greater than the second threshold value (Yes in S206), the wavelength selection switch means 22 increases the attenuation amount with respect to the optical signal having the intensity greater than the second threshold value. Meanwhile, the optical detection means 23 determines that none of the optical signals subjected to intensity detection has the intensity greater than the second threshold value (No in S206), the optical transmission device 2 ends the operation.

As described above, the optical transmission device 2 includes the wavelength selection switch means 22 and the optical detection means 23. The wavelength selection switch means 22 attenuates each of the plurality of optical signals output from the plurality of optical transmitting means (optical transmitters 11) according to the attenuation amount, and multiplexes and outputs the attenuated optical signals. Further, the optical detection means 23 detects intensity of at least one optical signal of the plurality of optical signals, and performs comparison with the intensity, and the first threshold value and the second threshold value greater than the first threshold value. Moreover, the wavelength selection switch means 22 reduces the attenuation amount with respect to the optical signal when the intensity of the optical signal is less than the first threshold value, and increases the attenuation amount with respect to the optical signal when the intensity of the optical signal is greater than the second threshold value greater than the first threshold value, based on the result of the comparison. With this, the wavelength selection switch means 22 controls the attenuation amount in such a way that the intensity of the optical signal is a value between the first threshold value and the second threshold value.

The intensity of the optical signal to be input to the optical transmission device 2 may fluctuate due to aging deterioration, a failure, or the like of the optical transmitter for outputting the optical signal, the land transmission path for connecting the optical transmitter to the land terminal station, or the like. In the optical transmission device 2, even when the intensity of the optical signal fluctuates, the intensity of the optical signal can be restored from the first threshold value to the second threshold value.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1 Optical transmission system
2 Optical transmission device
10, 10A, 10B, 10C Data center
11 Optical transmitter
12 Control device
20 Optical transmission device
22 Wavelength selection switch means
23 Optical detection means
24 Alarm signal generation means
25 Split means

What is claimed is:
1. An optical transmission system comprising:
an optical transmission device; and
a plurality of optical transmitters,
wherein
the optical transmission device comprises:
a wavelength selection switch configured to attenuate each of a plurality of optical signals being output from the plurality of optical transmitters according to an attenuation amount, and multiplex and output the optical signals being attenuated;
an optical detector configured to detect intensity of at least one of the plurality of optical signals and performs comparison between the intensity, and a first threshold value and a second threshold value greater than the first threshold value, wherein
the wavelength selection switch controls the attenuation amount in such a way that the intensity of the optical signal subjected to intensity detection is a value between the first threshold value and the second threshold value, by reducing the attenuation amount with respect to the optical signal when the intensity of the optical signal subjected to intensity detection is less than the first threshold value, and increasing the attenuation amount with respect to the optical signal when the intensity of the optical signal subjected to intensity detection is greater than the second threshold value, based on a result of the comparison, and wherein when the intensity of the optical signal is less than the first threshold value, and a difference between the intensity of the optical signal and the first threshold value is greater than the attenuation amount, an optical transmitter which has output the optical signal increases the intensity of the optical signal.

2. The optical transmission system according to claim 1, further comprising:
an alarm signal generator configured to generate an alarm signal when the intensity of the optical signal is less than the first threshold value or the intensity of the optical signal is greater than the second threshold value.

3. The optical transmission system according to claim 2, wherein the alarm signal generator transmits the alarm signal to a control device of the optical transmitter which has output the optical signal.

4. The optical transmission system according to claim 3, wherein
the wavelength selection switch attenuates each of the plurality of optical signals being input from the plurality of optical transmitters via a land transmission path provided on land, and outputs the optical signal being multiplexed to a submarine transmission path provided in ocean.

5. The optical transmission system according to claim 3, wherein
the wavelength selection switch adjusts the attenuation amount for each bandwidth of the optical signal.

6. The optical transmission system according to claim 3, wherein,
when the intensity of the optical signal is less than the first threshold value, and a difference between the intensity of the optical signal and the first threshold value is greater than the attenuation amount, the optical transmitter which has output the optical signal increases the intensity of the optical signal.

7. The optical transmission system according to claim 2, wherein
the wavelength selection switch attenuates each of the plurality of optical signals being input from the plurality of optical transmitters via a land transmission path provided on land, and outputs the optical signal being multiplexed to a submarine transmission path provided in ocean.

8. The optical transmission system according to claim 2, wherein
the wavelength selection switch adjusts the attenuation amount for each bandwidth of the optical signal.

9. The optical transmission system according to claim 2, wherein,
when the intensity of the optical signal is less than the first threshold value, and a difference between the intensity of the optical signal and the first threshold value is greater than the attenuation amount, the optical transmitter which has output the optical signal increases the intensity of the optical signal.

10. The optical transmission system according to claim 1, wherein
the wavelength selection switch attenuates each of the plurality of optical signals being input from the plurality of optical transmitters via a land transmission path provided on land, and outputs the optical signal being multiplexed to a submarine transmission path provided in ocean.

11. The optical transmission system according to claim 10, wherein
the wavelength selection switch adjusts the attenuation amount for each bandwidth of the optical signal.

12. The optical transmission system according to claim 1, wherein
the wavelength selection switch adjusts the attenuation amount for each bandwidth of the optical signal.

13. An optical transmission method comprising:
attenuating each of a plurality of optical signals being output from a plurality of optical transmitters according to an attenuation amount;
multiplexing and outputting the optical signals being attenuated;
detecting intensity of at least one of the plurality of optical signals and performing comparison between the intensity, and a first threshold value and a second threshold value greater than the first threshold value;
controlling the attenuation amount in such a way that the intensity of the optical signal subjected to intensity detection is a value between the first threshold value and the second threshold value, by reducing the attenuation amount with respect to the optical signal when the intensity of the optical signal subjected to intensity detection is less than the first threshold value, and increasing the attenuation amount with respect to the optical signal when the intensity of the optical signal subjected to intensity detection is greater than the second threshold value, based on a result of the comparison; and
when the intensity of the optical signal is less than the first threshold value, and a difference between the intensity of the optical signal and the first threshold value is greater than the attenuation amount, an optical transmitter which has output the optical signal increases the intensity of the optical signal.

* * * * *